United States Patent Office 3,296,124
Patented Jan. 3, 1967

3,296,124
PROCESS FOR PREPARING A USEFUL WATER
FROM A NATURAL SALT WATER AND RE-
COVERING VALUES CONTAINED THEREIN
Sidney M. Heins, 7132 N. Ashland Ave.,
Chicago, Ill. 60626
No Drawing. Filed Oct. 23, 1964, Ser. No. 406,147
9 Claims. (Cl. 210—45)

This invention relates to a process for treating a natural salt water for recovery of its values. More particularly, the invention relates to a process for reducing the salt content of a natural water having an excessive salt content, to render the water useful for drinking, irrigation, or other purposes requiring a low salt content, and also for producing a useful compound from the salt content.

Numerous methods have been proposed and employed for treating natural salt waters to render them useful for consumption, irrigation, and other purposes requiring a low salt content, to alleviate the problems caused by shortages of useful water. Economic and practical considerations have mitigated against the use of the prior methods on a large scale.

In accordance with the present invention, I have now provided a process for treating a natural salt water to reduce the salt content thereof that is economically very attractive. The new process may be employed to remove substantially all or any part of the salt content, as desired. The salt content is converted to a useful sodium compound which may be recovered separately.

The new process embodies reacting a natural salt water with silicofluoride ions to precipitate sodium ions in the form of sodium silicofluoride. In a preferred embodiment, hydrosilicofluoric acid is employed as a source of silicofluoride ions, and the acid is reacted with the salt water, particularly its sodium chloride content, to precipitate sodium silicofluoride. The reaction may be represented as follows:

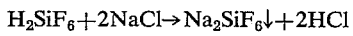

Hydrosilicofluoric acid is a by-product in the manufacture of superphosphate, and it is commercially available in quantity and at low cost. Sodium silicofluoride presently commands an attractive market price. The invention thus provides an economic process in which salt water is treated with a low cost additive to produce both usable water and saleable sodium silicofluoride.

The invention may be employed for treating various natural salt waters or brines, such as water from salt lakes, well waters, and, especially, sea waters. The reaction is effected very simply by mixing a source of silicofluoride ions, preferably hydrosilicofluoric acid, with the water at ambient temperature. Sodium silicofluoride precipitates readily and it may be separated from the resulting liquid or mother liquid by conventional methods, such as centrifugation, filtration, dialysis, settling and decantation, and the like. The salt waters also may contain other cations, especially potassium, calcium, and magnesium. The potassium and calcium silicofluorides are insoluble, and they precipitate and are removed together with the sodium silicofluoride. The magnesium remains in solution.

Hydrogen chloride also is produced in the reaction with hydrosilicofluoric acid, and it is present in the product water in a concentration which depends upon the amount of water present in the reaction mixture. The hydrogen chloride may be removed or its concentration reduced in known manner, by oxidation and/or heating of the product water, such as by aeration, or by absorption with activated charcoal. Alternatively, the product water may be diluted or blended with salt-free water available from other sources. In either case, the hydrogen chloride content may be utilized for purifying the water. When the product water is intended for irrigation use, the hydrogen chloride may be reacted with ammonia, such as anhydrous ammonia, so that it is converted to beneficial ammonium chloride. The acidity of the product water also may be adjusted or neutralized in other known ways as may be suitable for various purposes.

Hydrosilicofluoric acid is employed in aqueous solution. A commercially available product contains 27–30% by weight of the acid, and it may be employed in various other concentrations, as desired. In the event that the acid is not available as the by-product of superphosphate manufacture, it can be manufactured readily. For example, it may be produced by reacting ground or pulverized fluorspar containing silica, and sulfuric acid. The reaction is as follows:

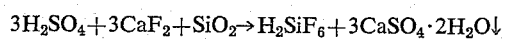

The quantity of silicofluoride ions employed for treating the salt water is selected according to the type of product water and degree of desalting desired. For example, in the production of potable water, it may be desired to remove all or substantially all of the salt, or sodium chloride. In this case, an amount of silicofluoride ions representing about a stiochiometric reaction quantity based on the sodium ion content of the water is employed. Where the water contains in addition to sodium ions, other cations that form precipitates with silicofluoride ions, particularly potassium and calcium, an additional amount of silicofluoride ions consitituting a stiochiometric reaction quantity with the remaining cations is provided. The reactions go substantially to completion, and excess silicofluoride ions are neither necessary nor desirable. Thus, certain sea waters may contain about 2.5%, by weight, of sodium chloride, and about 0.8% of potassium, calcium and magnesium chlorides. A sufficient quantity up to a stiochiometric amount of hydrosilicofluoric acid is mixed and reacted with the water to precipitate substantially all of the sodium, potassium and calcium ions in the form of their silicofluoride salts. Other salt waters are treated similarly.

Less than all of the salt content of a natural water may be removed for certain purposes. For example, where the product water is to be diluted with salt-free water or is to be used for irrigation, a residual salt content may be tolerable. The process of the invention also may be employed in conjunction with other water desalting, recovery or purification processes, such as dialysis, ion exchange processes, and others, wherein a part of the salt content may be removed according to the present invention and part may be removed according to another process. In such cases, appropriate quantities of silicofluoride ions may be employed, less than stoichiometric amounts, which are sufficient to react with and precipitate the desired portion of the salt content.

It will be apparent that the new process may be employed with the principal objective of producing silicofluorides from natural salt water. The process may be employed alone or in conjunction with known concentration, separation, exchange, and/or recovery processes and the like.

The invention is illustrated by the following example, It will be understood that the invention is not limited to the example or to the materials, proportions, conditions, and procedures which are exemplified therein. In the example, all proportions are by weight.

*Example*

Aqueous hydrosilicofluoric acid solution is reacted with sea water to precipitate the sodium ion content of the latter. The acid is employed in a concentration of 10%.

The sea water contains 2.6% sodium cholride, 0.1% magnesium chloride, traces of bromides, and no sulfur. In providing a stoichiometric quantity of hydrosilicofluoric acid, 320 parts of the acid solution are employed with 1000 parts of sea water. The solutions are mixed at ambient temperature, and a precipitate of sodium silicofluoride forms. The precipitate is separated from the product water by centrifugation. The product water contains 1.27% hydrogen chloride, which is removed by aeration and atmospheric oxidation. Alternatively, the hydrogen chloride is neutralized with anhydrous ammonia or ammonium hydroxide providing 7.6 parts of ammonia.

The invention thus provides a useful and economic process for treating a natural water having an excessive salt content to reduce the salt content to a useful level. The process may be used alone or in conjunction with other treatment processes to convert salt water to water useful for numerous purposes and, at the same time, to produce valuable sodium silicofluoride. Waters from various sources and in various localities may be treated. The process is readily and conveniently conducted.

Having thus described the invention what I claim as new and desire to secure by Letters Patent is:

1. In a process for preparing a useful water from a natural salt water having an excessive salt content, the steps which comprise reacting such natural water with hydrosilicofluoric acid to precipitate sodium silicofluoride, separating the precipitate from the resulting liquid, removing hydrogen chloride from the resulting liquid, and recovering the resulting liquid.

2. In a process for preparing a useful water from sea water, the steps which comprise reacting sea water with an amount of hydrosilicofluoric acid substantially sufficient to precipitate the sodium ion content of the water in the form of sodium silicofluoride, separating the precipitate from the resulting liquid, reducing the acidity of the resulting liquid, and recovering the resulting liquid.

3. A process as defined in claim 2 wherein said hydrosilicofluoric acid is reacted in about a stoichiometric amount based on the precipitatable cation content of the water to precipitate such cations in the form of their silicofluorides.

4. In a process for preparing a useful water from a natural salt water having an excessive salt content, the steps which comprise reacting such natural water with hydrosilicofluoric acid to precipitate sodium silicofluoride, separating the precipitate from the resulting liquid, reducing the acidity of the resulting liquid, and recovering the resulting liquid.

5. In a process for preparing a useful water from a natural salt water having an excessive salt content, the steps which comprise reacting such natural water with hydrosilicofluoric acid to precipitate sodium silicofluoride, separating the precipitate from the resulting liquid, reacting hydrogen chloride in the resulting liquid with ammonia, and recovering the resulting liquid.

6. A process for recovering values contained in natural salt water which comprises reacting such natural water with hydrosilicofluoric acid to produce a precipitate containing sodium silicofluoride, separating the precipitate from the resulting liquid, reducing the acidity of the resulting liquid, and separately recovering the precipitate and the resulting liquid.

7. A process as defined in claim 6 wherein hydrogen chloride is removed from the resulting liquid.

8. A process as defined in claim 6 wherein hydrogen chloride in the resulting liquid is reacted with ammonia.

9. A process as defined in claim 6 wherein said hydrosilicofluoric acid is reacted in about a stoichiometric amount based on the precipitatable cation content of the water to precipitate such cations in the form of their silicofluorides.

References Cited by the Examiner

FOREIGN PATENTS 413    1858    Great Britain.

OTHER REFERENCES

Ellis, C.B., Fresh Water From the Ocean, 1954, Ronald Press Co., New York, pp. 175–179.

MORRIS O. WOLK, *Primary Examiner.*

MICHAEL E. ROGERS, *Examiner.*